US012095856B2

(12) United States Patent
Li et al.

(10) Patent No.: US 12,095,856 B2
(45) Date of Patent: Sep. 17, 2024

(54) SYSTEM AND METHOD OF SOCIAL AUTHENTICATION AND DATA SYNCHRONIZATION IN A NETWORK

(71) Applicant: Huawei Technologies Co., Ltd., Shenzhen (CN)

(72) Inventors: Jian Li, Waltham, MA (US); Han Su, Ann Arbor, MI (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/446,880

(22) Filed: Aug. 9, 2023

(65) Prior Publication Data

US 2023/0388374 A1    Nov. 30, 2023

Related U.S. Application Data

(63) Continuation of application No. PCT/US2021/017615, filed on Feb. 11, 2021.

(51) Int. Cl.
*H04L 67/104* (2022.01)
*G06F 21/62* (2013.01)

(52) U.S. Cl.
CPC ............ *H04L 67/104* (2013.01); *G06F 21/62* (2013.01)

(58) Field of Classification Search
CPC .............................. G06F 21/62; H04L 63/104
See application file for complete search history.

(56) References Cited

U.S. PATENT DOCUMENTS

| 2007/0180078 A1 | 8/2007 | Murphy et al. |
| 2014/0245382 A1* | 8/2014 | Pannu ...................... G06F 21/62 726/1 |
| 2016/0173499 A1 | 6/2016 | Bianchi et al. |
| 2020/0279183 A1* | 9/2020 | Chrapko ............ G06Q 10/0635 |

FOREIGN PATENT DOCUMENTS

WO         2006115919         11/2006

OTHER PUBLICATIONS

International Search Report and Written Opinion dated Oct. 12, 2021, International Application No. PCT/US2021/017615.
Benet, Juan "IPFS—Content Addressed, Versioned, P2P File System (Draft 3)", Jul. 14, 2014, pp. 1-11.

(Continued)

*Primary Examiner* — June Sison
(74) *Attorney, Agent, or Firm* — Vierra Magen Marcus LLP

(57) ABSTRACT

The present technology discloses storing data in a peer-to-peer network. A first computing device identifies other computing devices in the peer-to-peer network. Each of the computing devices have an established social relationship with at least another one of the computing devices. A degree of connection between the first computing device and each of the other computing devices is detected. A group of the other of computing devices is selected based on the degree of connection for storing the data, and a storage trust level is assigned to each of the other computing devices in the group. The storage trust level of each of the other computing devices is based on the established social relationship. The data is then transmitted to each of the other computing devices in the group for storage.

20 Claims, 7 Drawing Sheets

(56) References Cited

OTHER PUBLICATIONS

Kothadiya, Henal et al., "Security and Privacy of Data In Multi Cloud with Data Backup and Data Recovery Service", International Journal on Future Revolution in Computer Science & Communication Engineering, vol. 4, Issue 4, Apr. 2018, pp. 186-190.
International Preliminary Report on Patentability dated Aug. 24, 2023, International Application No. PCT/US2021/017615.

* cited by examiner

SYSTEM AND METHOD OF SOCIAL AUTHENTICATION AND DATA SYNCHRONIZATION IN A NETWORK

CLAIM OF PRIORITY

This application is a continuation of, and claims priority to PCT Patent Application No. PCT/US2021/017615, entitled "SYSTEM AND METHOD OF SOCIAL AUTHENTICATION AND DATA SYNCHRONIZATION IN A NETWORK", filed Feb. 11, 2021, which application is incorporated by reference herein in its entirety.

FIELD

This disclosure generally relates to data storage and authentication in a peer-to-peer network.

BACKGROUND

Backing up important data has long been a standard practice. Clients traditionally rely on local storage devices to store data, but maintaining such a centralized, full backup system is expensive, especially when large amounts of data are involved. An online or cloud-based backup system of the data is typically preferred over local storage devices, as it ensures data persistence. However, cloud backup typically locks in users with a specific vendor. Therefore, user data still faces out-of-control risks when regulations or business changes. While cloud backup systems have become increasingly popular with users, peer-to-peer systems provide an alternative that potentially offers unlimited storage for backup and return the data ownership back to the users. These peer-to-peer systems share resources amongst computing devices in the network without the need for a central server service provider. For example, peers make a portion of their resources, such as disk storage, directly available to other computing devices on the network. Accessing a computing device in the network is generally transparent, as if the accessed device were a resource on the local machine. However, such peer-to-peer backup systems can introduce new concerns about reliability, recovery, security, privacy and trust, due to the volatility of networks and difficulty in authenticating peers during backup and recovery.

SUMMARY

According to one aspect of the present disclosure, there is a computer-implemented method of storing data in a peer-to-peer network, comprising identifying, by a first computing device, a plurality of computing devices in the peer-to-peer network, each of the computing devices having an established social relationship with at least another the plurality of computing devices in the peer-to-peer network; determining, by the first computing device, a degree of connection between the first computing device and each of the plurality of computing devices in the peer-to-peer network, each degree of connection between the first computing device and the plurality of computing devices being a degree of separation between two users respectively corresponding to the first computing device and the plurality of computing devices; selecting, by the first computing device, a group of the plurality of computing devices based on the degree of connection for storing the data in the peer-to-peer network; assigning, by the first computing device, a storage trust level to each of the plurality of computing devices in the group, the storage trust level of each of the plurality of computing devices based on the established social relationship; and transmitting, by the first computing device, the data to each of the plurality of computing devices in the group for storage.

Optionally, in any of the preceding aspects, the method further comprising generating a list of the plurality of computing devices, including the storage trust level of each of plurality of computing devices, based on the degree of connection.

Optionally, in any of the preceding aspects, the method further comprising requesting, by the first computing device, the data from the group of the plurality of computing devices; authenticating the request for the data by the first computing device based on an adjustable identity rating received from each of the plurality of computing devices in the group; receiving, by the first computing device, the data from the plurality of computing devices when a total score of the identity ratings of each of the plurality of computing devices in the group satisfies a threshold; and synchronizing the data received by the plurality of computing devices with the first computing device.

Optionally, in any of the preceding aspects, wherein the requesting further comprises identifying, by the first computing device, one of the computing devices in the group of the plurality of computing devices, wherein the identified computing device in the group is configured to initiate the identity rating; and notifying, by the first computing device, each of the plurality of computing devices in the group that a request for the data has been initiated.

Optionally, in any of the preceding aspects, wherein the list of the plurality of computing devices and the data are stored on each of the plurality of computing devices in the list.

Optionally, in any of the preceding aspects, wherein the established social relationship between the first computing device and the plurality of computing devices is formed based on the established social relationships of corresponding users by at least one of a mutually declared relationship, an existing social network relationship and a stored contact list.

Optionally, in any of the preceding aspects, wherein the established social relationship is formed based on social interactions and shared experiences between users of the first computing device and each of the plurality of computing devices in the group.

Optionally, in any of the preceding aspects, wherein the storage trust level is defined by the first computing device based on identity ratings assigned to each of the plurality of computing devices by the first computing device, and the identity ratings are assigned based on a nature of the established relationship between the first computing device and each of the plurality of computing devices.

Optionally, in any of the preceding aspects, wherein the degree of connection between the first computing device and each of the plurality of computing devices in the peer-to-peer network is adjustable.

Optionally, in any of the preceding aspects, wherein adjusting the degree of connection between the first computing devices and the plurality of computing devices increases the degree of separation when increased and decreases the degree of separation when decreased.

According to one aspect of the present disclosure, there is a non-transitory computer-readable medium storing computer instructions for storing data in a peer-to-peer network, that when executed by one or more processors, cause the one or more processors to perform the steps of identifying a plurality of computing devices in the peer-to-peer network by a first computing device, each of the computing devices having an established social relationship with at least another of the plurality of computing devices in the peer-to-peer network; determining a degree of connection between the first computing device and each of the plurality of computing devices in the peer-to-peer network, each degree of connection between the first computing device and the plurality of computing devices being a degree of separation between two users respectively corresponding to the first computing device and the plurality of computing devices;

selecting a group of the plurality of computing devices based on the degree of connection for storing the data in the peer-to-peer network; assigning a storage trust level to each of the plurality of computing devices in the group, the storage trust level of each of the plurality of computing devices based on the established social relationship; and transmitting the data to each of plurality of computing devices in the group for storage.

According to one aspect of the present disclosure, there is a first computing device for storing data in a peer-to-peer network, comprising a non-transitory memory storage comprising instructions; and one or more processors in communication with the memory, wherein the one or more processors cause the first computing device to execute the instructions to identify a plurality of computing devices in the peer-to-peer network, each of the computing devices having an established social relationship with at least another of the plurality of computing devices in the peer-to-peer network; determine a degree of connection between the first computing device and each of the plurality of computing devices in the peer-to-peer network, each degree of connection between the first computing device and the plurality of computing devices being a degree of separation between two users respectively corresponding to the first computing device and the plurality of computing devices; select a group of the plurality of computing devices based on the degree of connection for storing the data in the peer-to-peer network; assign a storage trust level to each of the plurality of computing devices in the group, the storage trust level of each of the plurality of computing devices based on the established social relationship; and transmit the data to each of plurality of computing devices in the group for storage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
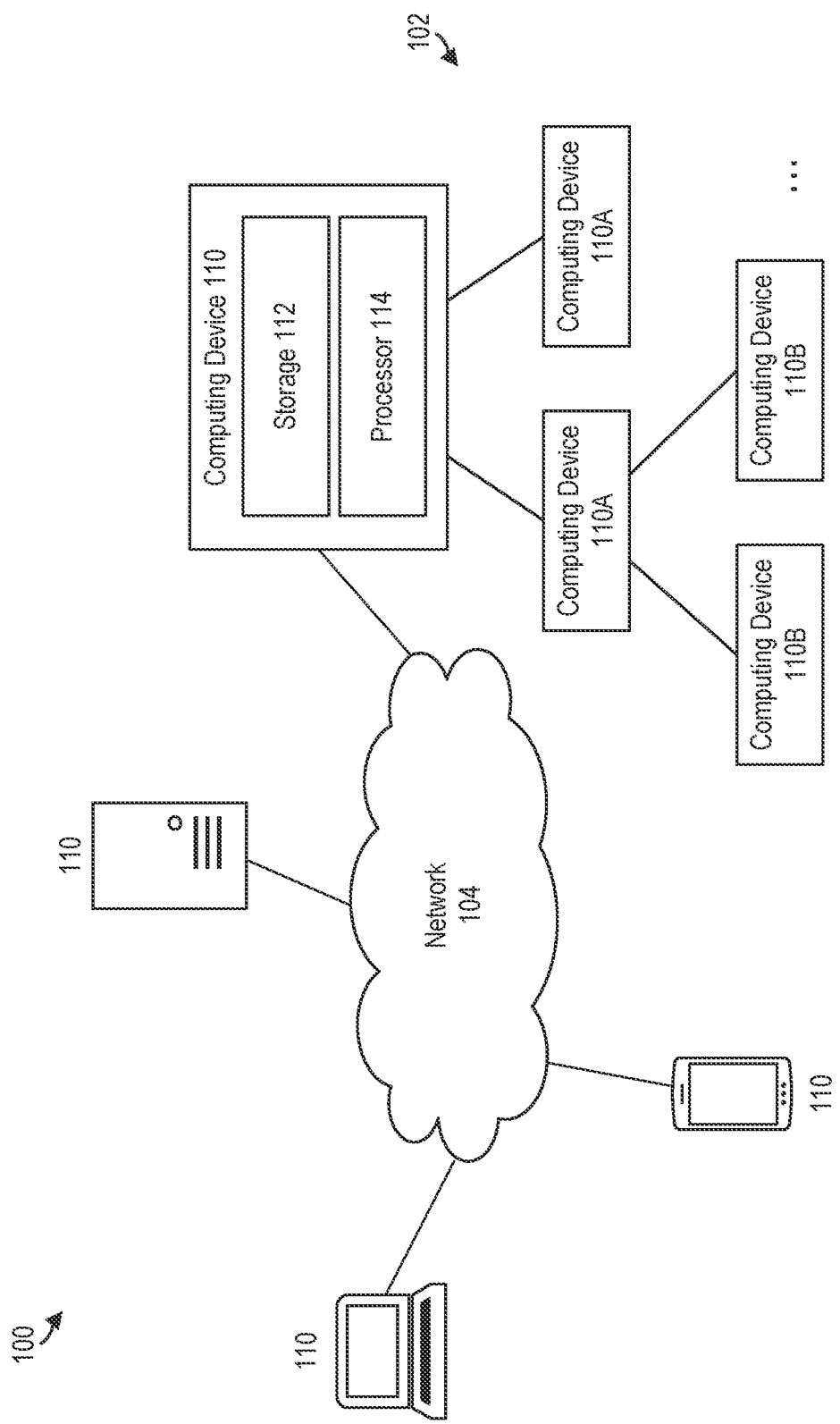
FIG. 1 illustrates an example system including a peer-to-peer network.

The present disclosure will now be described with reference to the figures, which generally relate to data storage and authentication in a peer-to-peer network.

In a traditional client-server network, a dedicated computing device (i.e., server) is used to store data, provide and manage resources, and control user access. The server acts as a central point in the network upon which other computing devices may connect to store files. Unlike a client-server network, in a peer-to-peer network computing devices share files by sending and receiving digital files directly over the network. The shared files are stored on and served by the computing devices of the users in the peer-to-peer network. In conventional peer-to-peer networks, peer computing devices are typically selected on a random basis.

In the disclosed technology, a file sharing and data storage and synchronization system provides a decentralized, load-balanced and distributed way to store and retrieve files on peer computing devices with existing and established social relationships. In one embodiment, peer-to-peer relationships are real-world relationships that can be selected by a peer computing device in the network either manually or automatically. Once relationships are identified in the network, each of the peer computing devices may be assigned a voting right or rank based on a level of trust that is based on the real-world and established social relationship. The assigned voting right may then be used as a mechanism to authenticate peer computing devices. In a further embodiment, peer computing devices can determine a degree of connection between other computing devices in which to share and store files and data. In one embodiment, the degree of connection is adjustable. In another embodiment, the established social relationship is reciprocal such that the related peer computing devices store each other's files and data. When a peer computing device requests synchronization of files or data, the peer computing device may be authenticated by other peer computing devices and the files or data may be retrieved from backup.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications, and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates an example system including a peer-to-peer network. The system 100 includes a network 104, such as a peer-to-peer network, having computing devices (or nodes) 110 configured to store files in a distributed manner. In general, a peer-to-peer network may be a distributed application architecture that partitions tasks or workloads between the computing devices 110 (i.e., peers). The computing devices 110 of a peer-to-peer network may make a portion of their resources, such as processing power, disk storage, or network bandwidth, directly available to other network participants, without the need for central coordination by servers or stable hosts. As such, peers may take the role of both suppliers and consumers of resources, in contrast to the traditional client-server model in which the consumption and supply of resources is, generally, strictly divided. Although system 100 shows four computing devices 110 and a single network 104, it is appreciated that any number of computing devices 110 and/or networks 104 may be implemented, and the system 100 is not limited to the disclosed embodiment.

In one embodiment, the network 104 operates within a distributed computing system connected via a communications network. In other embodiments, the network 104 may include independent computing devices that each participate in the network 104. In general, the network 104 may be any IP-compatible network or IP-encapsulated network. For example, the network 104 may include one or more of the Internet, an intranet, an extranet, a cellular network, a local area network (LAN), a home area network (HAN), metropolitan area network (MAN), a wide area network (WAN), public and private networks, etc. In one embodiment, the network 104 is an Internet Protocol (IP)-based network in which computing devices 110 exchange data packets using any number of communications protocols, including the transmission control protocol (TCP) or other protocols. The network 104 may operate as any one or more of a mobile ad-hoc network, an unstructured peer-to-peer network, a secure peer-to-peer network, a structured peer-to-peer network, named data networks, or a hybrid network that consists of a peer-to-peer network combined with a client server network.

A peer-to-peer network may be an architecture that partitions processes between computing devices 110. In one embodiment, the computing devices 110 are equally privileged network devices or applications. In another embodiment, the computing devices 110 have designated privileges. In an unstructured peer-to-peer network, the links between computing devices 110 may be established arbitrarily. Such networks may be easily constructed, as any time a new computing device 110 attempts to join the network, the computing device 110 may join the network by copying existing links of another computing device 110. The computing device 110 may form new links and modify its links over time. Conversely, if the overlay is organized into a specific topology and the peer-to-peer network protocol ensures that any computing device 110 can efficiently search the network for a file/resource then the peer-to-peer network is termed structured.

A mobile ad hoc network may be a continuously self-configuring, infrastructure-less network of mobile devices connected by a wireless communication mechanism (e.g., Wi-Fi or radio signals). A tactical airborne network may be designed to provide protected air-to-air communications for military aircraft. Tactical airborne networks may utilize significant design sophistication due to the need to provide higher capacity, longer range, greater flexibility, and increased interoperability due to domain characteristics particular to tactical airborne networks, such as long transmission ranges, low-to-medium data rates, latency constraints, and link protection requirements.

A hybrid peer-to-peer and client server network may utilize a combined architecture that generally uses capabilities of both types of networks. Typically, the peer-to-peer portion of the network is built using an overlay technology. A secure peer-to-peer network may be a peer-to-peer network that has had some types of security mechanisms added to the architecture to attempt to counter some of the vulnerabilities of a general peer-to-peer network.

In one embodiment, computing devices 110 include storage 112 (e.g., local storage) and one or more processors (e.g., processor 114). For example, computing devices 110 may be a tablet computer, a smartphone, a personal digital assistant (PDA), a laptop computer, a navigation system, a digital camera, a computerized vehicle, a computerized watch (e.g., a smart watch), computerized eyewear, computerized headwear, other types of wearable computing devices, a media player, a television platform, or any other type of mobile and/or non-mobile computing device that is configured to perform a media operation as described herein. In another example, the computing devices 110 may simply be storage.

In some examples, storage devices may include one or more computer-readable storage media. Storage 112 may be configured to store larger amounts of information than volatile memory. Storage 112 may further be configured for long-term storage of information. In some examples, storage devices include non-volatile storage elements. Examples of such non-volatile storage elements include magnetic hard disks, optical discs, floppy disks, flash memories, or forms of electrically programmable memories (EPROM) or electrically erasable and programmable (EEPROM) memories.

The computer-readable storage media of storage 112 may include volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by the processor 114.

As noted above, the computing devices 110 may include one or more processors 114. The processors 114 may operate together or in parallel to perform the techniques described herein. Processors 114 in one example, is configured to implement functionality and/or process instructions for execution within the computing devices 110. For example, processors 114 may be capable of processing instructions stored in the storage 112 of the computing devices 112. Examples of the processors 114 may include, any one or more of a microprocessor, a controller, a digital signal processor (DSP), an application specific integrated circuit (ASIC), a field-programmable gate array (FPGA), or equivalent discrete or integrated logic circuitry.

In one example, a peer-to-peer (P2P) group 102 includes a plurality of computing devices that communicate with each other. In the P2P group 102, computing devices 110, 110A, 110B may communicate directly with each other, whereas the computing devices 110 that are not part of the P2P group 102 communicate indirectly with each other, such as through the network 104. It is appreciated, however, that the P2P group may also communicate indirectly with each other via a network.

In the P2P group 102, a link exists between two computing devices that know each other (e.g., node 1 knows the location of node 2 and can communicate directly or indirectly with node 2) and have a relationship. The P2P group 102 can be a structured P2P network (such as a network with a specific overlay that organizes peers according to criteria and algorithms using distributed hash table based indexing) or an unstructured P2P network (such as a network that does not impose a structure on the overlay networks in which peers connect in an ad-hoc fashion), similar to network 100. By way of example, the P2P group 102, can include P2P systems with a single routing layer with equal peers, centralized P2P systems with a central server that executes functions, and hybrid P2P systems that allow infrastructure nodes to exist. In the P2P groups 102, storage systems and/or networks, members or peers can provide resources, such as bandwidth, storage space, and/or computing power. Administrative duties can be designated to one or more peers, distributed across the peers, or designated to a P2P manager or system administrator (such as a manager or administrator in a server).

In one embodiment, the network 100 of computing devices 110 and the P2P groups 102 maintain a file redundancy scheme in order to ensure that files are sufficiently available and not be lost, destroyed, or damaged. By way of example, erasure coding is used to reduce replication requirements in the systems, groups, networks. In erasure coding, messages of k symbols are transformed into longer messages or code words with n symbols such that the original message is recoverable from a subset of the n symbols. Additionally, the network 100 of computing devices can backup files using a compression and encryption scheme. For example, files are compressed and then encrypted with a private key that is provided to, accessed by, or known by the file owner. After the file is compressed and encrypted, it is erasure coded and then distributed in fragments or sections to other members or peers in the network.

The network is not limited to the depicted embodiment, and any number of computing devices and networks may be included in the system.

Figure 2:
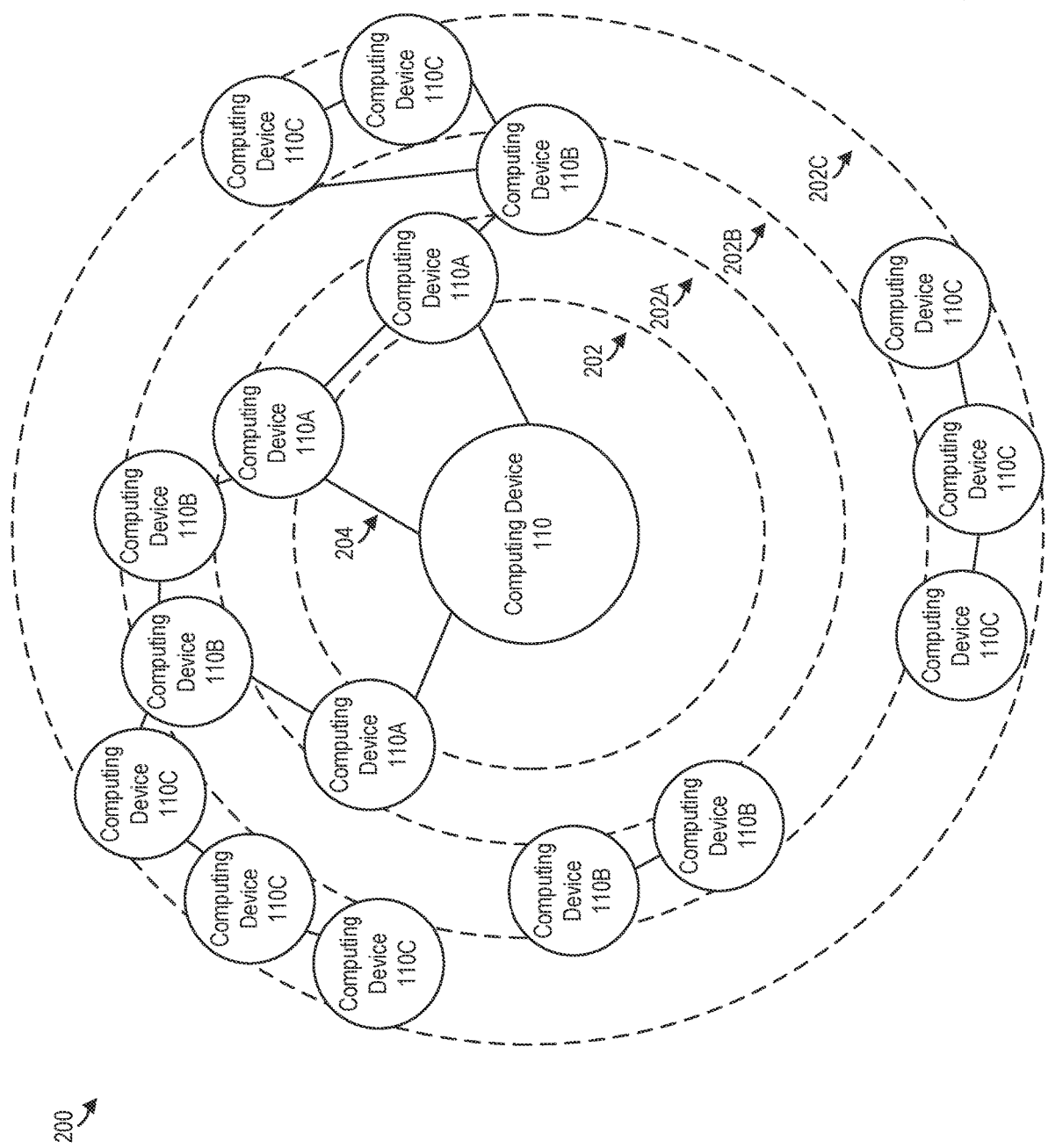
FIG. 2 illustrates example connections in a social network.

FIG. 2 illustrates example connections in a social network. The social network 200 may include or be part of the network 100 in FIG. 1. A social network can refer to a computer network connecting people or organizations by a set of social relationships, such as friendship, co-working, or information exchange. A social network can comprise profiles that can be associated with other profiles. Each profile may represent a member or peer, and a member can be an entity such as, for example, a person, an organization, a business, a corporation, a community, a fictitious person, or other entity. Each profile can contain entries, and each entry can comprise information associated with a profile. Examples of entries for a person profile can comprise contact information such as an email addresses, mailing address, or phone number; professional information; or any other information describing, identifying, or otherwise associated with a profile, such as the type of relationship (friend, co-worker, etc.) and the trustworthiness (level of trust) of the person or relationship.

Additionally, entries within a profile can comprise associations (or relationships) with other profiles. Associations between profiles within a social network be of a single type or multiple types and can include, for example, friendships, business relationships, acquaintances, community associations, activity partner associations, common interest associations, common characteristic associations, or any other suitable type of social relationship connection. Associations between profiles can also be weighted to represent the strength of the association. For example, a friendship association can be weighted more than a school association. Each type of association can have various levels of trust with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In one embodiment, a member profile can also contain rating information associated with the member or peer. For example, the member can be rated or scored by other members in the social network in specific categories, such as friendliness and trustworthiness. A member's category ratings can be contained in the member's profile. In one embodiment of the social network, a member can have buddies. Buddies can be other members who have indicated that they are "buddies" of the member. Rating information can also include the number of buddies of a member and identifiers of the buddies. Rating information can also include the rate at which a member accumulated ratings or buddies and how recently the member has been rated or acquired buddies. In this respect, buddy ratings may also identify or assist in identifying a members rating or score that is indicative of the level of trust to other members.

A member profile may comprise data stored in memory. The profile, in addition to comprising data about the member, can also comprise data relating to others. For example, a member profile can contain an identification of associations or virtual links with other member profiles. In one embodiment, a member's social network member profile may comprise a hyperlink associated with another member's profile. In one such association, the other member's profile may contain a reciprocal hyperlink associated with the first member's profile. These links may also form the basis not only for an association between members, but also indicate a level trustworthiness or degree of association between members as it identifies a reciprocal relationship.

Associations and relationships, including the level of trustworthiness and ratings, may be designated manually or automatically. For example, a member may designate associated members manually by selecting other profiles and indicating an association that can be recorded in the member's profile.

As illustrated in FIG. 2, edges between computing devices show the associations or relationships between therebetween. As shown, edges (or vertices) 204 are represented by the solid lines between computing devices. The association or relationship represented by the edges 204 may be any of those described above. For example, a first edge 204 between computing device 110 and computing device 110A may represent an association between profiles or a business association between the computing devices 110 and 110A.

In one embodiment, an association between two profiles may comprise a bi-directional (reciprocal) association when both parties to the association are associated with each other. For example, computing device 110 is associated with any one of computing devices 110A, and computing device 110A is also associated with computing device 110. In one other embodiment, the computing devices 110 and 110A are not bi-directionally associated with each other until both devices consent to such an association. For example, computing device 110 may invite one of the computing devices 110A to be associated therewith, and the bi-directional association occurs upon the computing device 110A acceptance of such invitation.

In one embodiment, a degree of connection between the computing device 110 and each of the other computing devices (e.g., computing devices 110A, 110B, 110C) may be determined. The degree of connection may be based on the associations or relationships between profiles based on a degree of separation. For example, a degree of separation in a social network may be defined relative to an association between profiles or members (or computing devices). As illustrated, the social network 200 shows four levels of a degree of separation from a computing device 110-a first level degree of separation 202, a second level degree of separation 202A, a third level degree of separation 202B and a fourth level degree of separation 202C. For example, a degree of separation can be determined based on the fewest number of associations between two computing devices 110. Thus, if computing device 110 has a relationship with one of computing devices 110A, and the same computing device 110A has a relationship with one of computing devices 110B, there is said to be a degree of separation of two between computing device 110 and computing device 110B. It is appreciated that any number of degrees of separation may be formed in the social network, and the disclosure is not limited to the depicted embodiment.

In one embodiment, a degree of separation between two members can be determined by the fewest number of edges of a certain type separating the associated computing devices. In another embodiment, a type-specific degree of separation may be determined. A type-specific degree of separation comprises a degree of separation determined based on one particular type of association. For example, the computing device 110 has a "friendship" association degree of separation of two from a computing device 110B. The fewest number of "friendship" associations between computing device 110 and one of the computing devices 110B is two—the friendship association comprising edge 204 between the computing device 110 and computing device 110A and the "friendship" association comprising edge 204 between the computing device 110A and computing device 110B. Thus, for the associated computing devices 110 and 110B, the degree of "friendship" separation, determined according to one aspect of one embodiment, is two.

In one example embodiment, the degree of separation may be used to identify member associations and relationships in the social network. For example, a category may be indicated literally or constructively for a relationship that has not yet been established, in which case the relationship may be established with the indicated category. For example, the member may have a contact list that designates another member as a friend, in which case a friend relationship may be established between the members in response to the designation. In another example, the contact list may be used to add members to the social network and to establish associations or relationships based on or within a certain number of degrees of separation from the member.

The list of contacts may be any personally maintained list or lists, such as, for example, an address book, a contact list for instant messaging, etc. For purposes of discussion, the example will be described with reference to an address book as a list of contacts. The contacts in an originating member's address book are added to the social network 200. Adding the contacts in the originating member's address book to the social network 200 includes adding the contacts as members of the social network 200 and establishing direct relationships between the originating member and the added contacts. For purposes of explanation, the originating member is the origin member of the established relationships, and each of the added contacts is the destination member of one of the established relationships. In one implementation, a particular contact may be added to the social network 200, and a relationship may be established between the originating member's and a particular contact, only when the originating member and the particular contact list each other in their respective contact lists (a reciprocal relationship).

Next, the contacts linked to the originating member (i.e., up to a desired degree of separation) are identified and added to the social network 200. To do so, the address books of each contact in the originating member's address book are accessed. The contacts' address books typically include communication identifiers selected by the contacts. In one implementation, the contacts' address books are stored in a central location. In another implementation, the address books are stored on local systems used by the contacts.

The contacts in the user's contacts' address books (i.e., the contacts separated by one degree) then may be added to the social network 200. Adding the contacts in the user's contacts' address books to the social network 200 includes adding the contacts as members of the social network 200 and establishing associations or relationships between the added contacts and other members of the social network 200. More particularly, a direct relationship is established between one of the added contacts and the member of the social network whose address book includes the added contact. In such a case, the member of the social network 200 whose address book includes the added contact is the origin member of the established relationship, and the added contact is the destination member of the established relationship.

In one embodiment, the degree of separation may be changed or adjusted. For example, the degree of separation may be increased or decreased. In the case of increasing the number, the degree of separation is incremented such that the address books of the contacts that are separated from the user by one degree are accessed and the contacts in those address books are added to the social network 200. The addition of contacts at larger degrees of separation from the originating member continues until the desired number of degrees of separation is reached. Once the desired number of degrees of separation has been reached, all of the contacts within that desired degree of separation from the member have been added to the social network 200.

Figure 3:
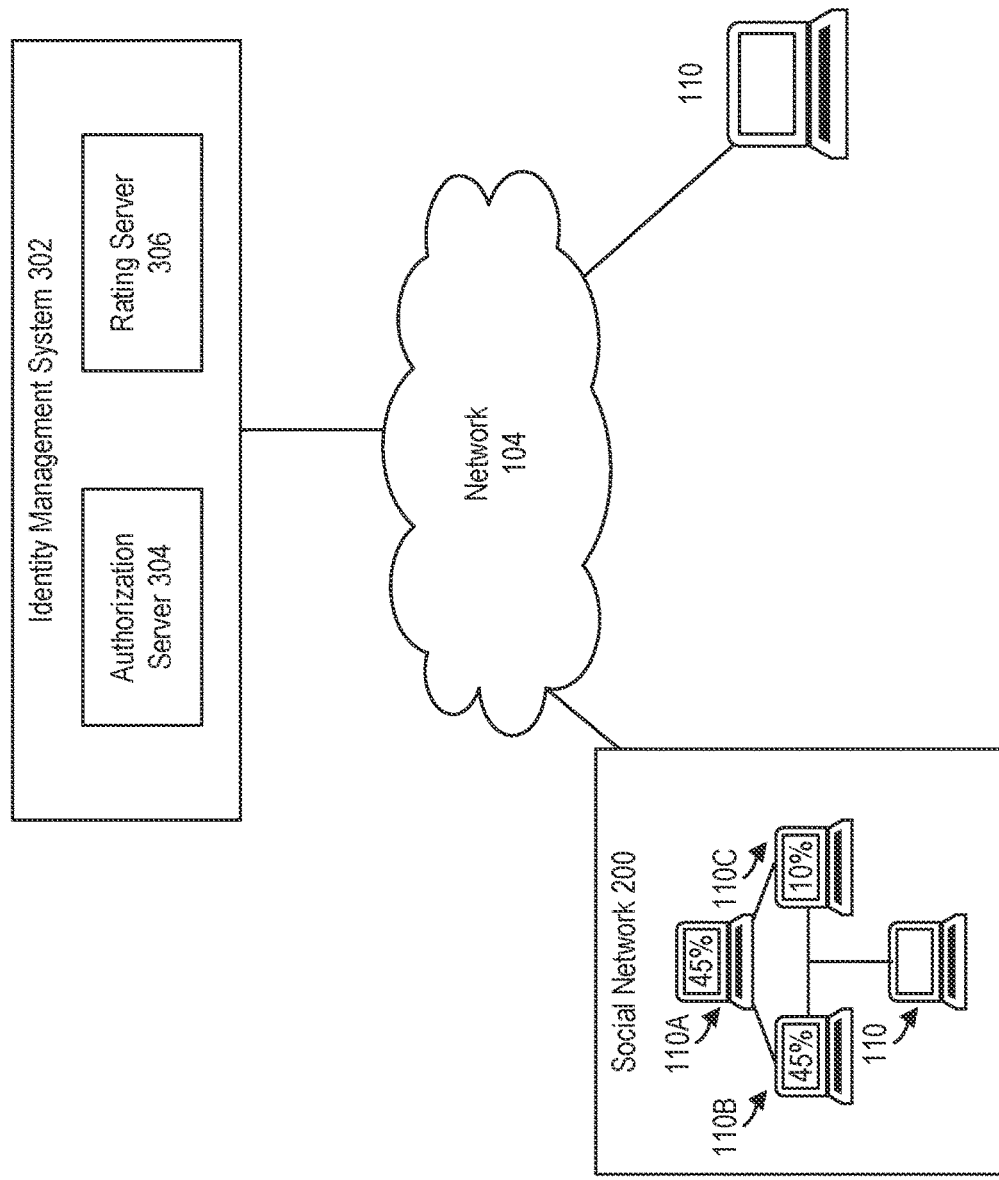
FIG. 3 illustrates an example of a social relationship based storage system in accordance with embodiments of the disclosure.

FIG. 3 illustrates an example of a social relationship-based storage system in accordance with embodiments of the disclosure. As shown, the storage system 300 includes one or more computing devices 110, social network 200, identity management system 302, and network 104. The identity management system 302 serves multiple socially networked computing devices 110 (or users) connected to a social network 200. The identity management system 302 also interacts with one or more of the computing devices 110 connected to the network 104 (e.g., the Internet, a Local Area Network ("LAN"), a Wide Area Network ("WAN"), or the like). In some embodiments, the identity management system 302 may be centralized at a single location. In other embodiments, the identity management system 302 may be geographically distributed in several different locations. In a further embodiment, the computing devices 110 in the social network 200 include an identity management system 302 or feature a similar system that can authorize and rate members associated with the computing devices 110 in the social network 200.

The identity management system 302 includes an authorization (or authentication) server 304 and a rating server 306. The authorization server 304 is used to manage access to the identity management system 302 and one or more social networks 200. The authorization server 304 ensures secure and controlled access of individuals and groups, including social networking members, and system access, including device applications, client/server applications, server-to-server interactions, and the like. Prior to any data being shared or stored on individual computing devices 110 in the social network 200, individual members are first authenticated. For example, the authorization server 304 uses authentication techniques to identify the individual member including: username and password pairs, biometric data, location, IP address, smart card access, challenge and response systems, keystroke pattern identification, language usage identification, and the like.

The identity management system 302 also includes the rating server 306 which may be used to provide members with an identity rating. The identity rating is the identity management system 302 confidence, based upon a number of factors, that the member accessing the system is the person he or she purports themselves to be. The rating may be dynamic (adjustable) and move up or down (i.e., higher confidence or lower confidence) based on how the user gained access to the identity management system 302, what identity verification steps were employed by the system during the system access by the user, the behavior in which the user is engaged, identity rating-altering factors by the user or other users (such as rating by vote), any combination thereof, and the like.

In one embodiment, the rating server 306 determines a numeric identity rating (e.g., a rating between 1-100). In this scenario, members may rate other members by voting on the trust level of each other. That is, to ensure or authenticate the identity of a member in the social network 200, other members may provide a rating by voting on the authenticity or confidence of a member. In one example, and with reference to storage system 300, a requesting computing device 110 may request data stored at one or more other member's computing devices 110A and 110B in the social network 200.

In one further embodiment, at the initiation of the request by computing device 110, the other computing devices 110A and 110B in the social network 200 may vote to authenticate the requesting computing device 110. For example, each of the computing devices 110A and 110B in the social network 200 may vote to confirm or deny the identity of the requesting computing device 110 by rating a trustworthiness or trust level that the computing device 110 is the member that he or she purports themselves to be.

The rating may be in any form that provides an indication of the trustworthiness of the computing device 110. In the depicted embodiment, the computing devices 110A, 110B and 110C each vote using a percentage-based system that totals to 100%. As shown, two of the computing devices provide a 45% positive confidence rating and one of the computing devices provides a 10% positive confidence rating that the computing device 110 is authentic. Thus, the total percentage of votes by computing devices 110A, 110B and 110C is 100% (45%+45%+10%), and the computing device 110 is authenticated since a majority of the votes have authenticated the computing device 110. In another embodiment, computing device 110A may vote with a negative confidence rating of 45%, computing devices 110B may vote with a positive confidence rating of 45%, and computing device 110C may vote with a negative confidence rating of 10%. In this case, the total percentage of positive confidence ratings is 45% and the total of negative confidence ratings is 55%. Thus, less than a majority of the votes have a positive confidence level and the authentication of computing device 110 fails. It is appreciated that the confidence level may be set to any threshold and is not limited to 50% or a majority of the vote. In one further embodiment, each confidence rating (or score) may be weighted such that a normalized rating is determined.

In still another example embodiment, the computing devices may select the trust level according to other non-numeric ratings. A non-numeric identity rating such as alphabetic characters, symbols, colors, combinations thereof, and the like, may also be used. For example, the selections available for the trust level are "unknown," "none," "marginal," and "full." The selections may be based on these trust levels according to the following descriptions. For the "unknown" trust level, the member does not know the contact, and, therefore, does not trust any type of document for storage. For the "none" trust level, the member knows the other member or contact, but does not trust the member with files other than public file types. For the "marginal" trust level, the user knows the member personally and trusts the member for storing confidential file types. For the "full" trust level, the user knows the member personally and trusts the member with any file type, including top secret file types.

The trust levels for a given member may also be adjusted or modified in some embodiments. For example, a member is connected as a friend through the social network 200 with another member. Thus, the member knows the contact, but may not trust that member to store confidential files. The member is therefore set to a trust level of "none." The member may update the trust information if the friendship changes such that the two members become better acquainted and form a stronger relationship. For example, the member may update the trust information of the other member to a "marginal" trust level rating. In this way, the next time the member uploads a confidential file, the system may use the updated information to recommend the other member when storing confidential files.

In still another embodiment, the rating may be based on the cumulative effect of several factors, not a single factor. For example, a high identity rating may require the member to (1) login from their home or office, (2) provide a username, and (3) have a strong password. In other embodiments, the identity management system 302 uses a single factor in a collection of factors that may dominate the identity rating (i.e., some factors may be weighted more heavily than other factors), for example an access code provided by the member requesting authentication. The following optional and non-limiting factors which may be used to identify and authenticate a member that is requesting storage of information in the social network 200 of peer computing devices.

Username—One factor for use in determining a member's identity rating is the username provided to a peer computing device in the social network 200. For example, the username may be recognizable to the members of the peer computing devices, in which case it is indicative of an authentic request. On the other hand, if the username does not match any known member identity and it's not recognizable, then it may indicate that the requesting member is fake and should not be authenticated.

Password—Another factor for use in determining a member's identity rating is the validation of a password when accessing the system to request data from peer computing device storage. For example, successful login or admittance into the storage system 300 using a password may be one factor in convincing other members in the social network 200 that the requesting computing device is authentic.

Recognized device—Yet another factor for use in determining a member's identity rating is whether a member is accessing the storage system 300 from a known computing device. For example, if the member has registered a computing device explicitly and/or even implicitly, using the device to access the storage system 300, it may increase the member's identity rating by providing a level of confidence to other members in the social network 200 when a request for storage is initiated. Conversely, if a member has registered a device and is not using the device to access the system, the member's identity rating may decrease.

Access Code—Another factor for use in determining a member's identity rating is whether the member is accessing the storage system 300 after entering a unique code which may be dynamically associated with the member. For example, a member may be provided with an application downloadable to the member's mobile device (e.g., tablet computer, smartphone, and the like). Optionally, this application provides the member with a dynamic access code which the member enters during the system access login process. Other peer members in the social network 200 may be informed that the code was successful or have a corresponding application on their own computing devices that verify the authenticity of the access code provided by the requesting member. This factor may serve as another indication that the requesting member is authentic for purposes of rating and voting on the authentication of the requesting member.

Security Questions—Still another factor for use in determining a member's identity rating is whether the member correctly answered one or more security questions asked by a peer member in the social network 200 and likely only known by the requesting member. When the requesting member initiates a request for data from a peer computing device, the requesting member may be presented with one or more security questions by the peer members. If the member has failed one or more questions, the requesting member's identity rating may be adversely affected. In this regard, there are a number of ways a set of security questions may be used by peer members to increase or decrease the confidence or trust level in the identity of the member.

Location—Yet another factor for use in determining a member's identity rating is whether the member is accessing the storage system 300 from a known location that may be identified by a peer computing device. In some embodiments, if the requesting member's location may be determined and the location is considered a "safe" location, then the peer members may increase the member's identity rating (increased confidence in member's identity). In other embodiments, if the requesting member's location may not be determined or determined to be outside of a safe location, then the peer members may decrease the member's identity rating. In one embodiment, a list of "safe" locations may be automatically identified by the identity management system 200 and provided to the peer members for ease of identification.

Additional factors may also be used in assessing or adjusting a member's identity rating. In some embodiments, a member's identity rating may increase according to these additional factors. In other embodiments, a member's identity rating may decrease according to these additional factors. The list below is meant to be exemplary and not intended to include every possible behavior characteristic.

Communication Methods—Another factor for use in determining a member's identity rating is the member's choice and frequency of communication methods. In some embodiments, a member primarily using email or text communication may be considered a lower risk than, for example, than simply logging into the storage system 300. In other embodiments, video conferencing may be considered a low risk form of communication because a member may visually confirm the identity of the caller/called party.

Suspicious Language/Phrases—Another factor for use in determining a member's identity rating is the member's composition style, as well as use of certain language and/or phrases. In one embodiment, a member employing profanity during a session may cause the member's session identity rating to fall. In another embodiment, a member employing language that appears to be grammatically incorrect or incoherent may cause the member's session identity rating to fall.

Language Style—Still another factor for use in determining a member's identity rating is the member's use of language. For example, certain members may use language that includes, for example, abbreviations for certain words, phraseology, lexicons, and the like. Use of such language may allow other peer members to recognize language style as an indicator in which to verify or authenticate another members identity. In one embodiment, language style may influence the rating of a requesting member such that the rating or score of the requesting members increases or decreases as a result of recognizing of failing to recognize the language style.

It is appreciated that the above factors are non-limiting examples, and that any number of different factors may be used in the rating system.

Figure 4A:
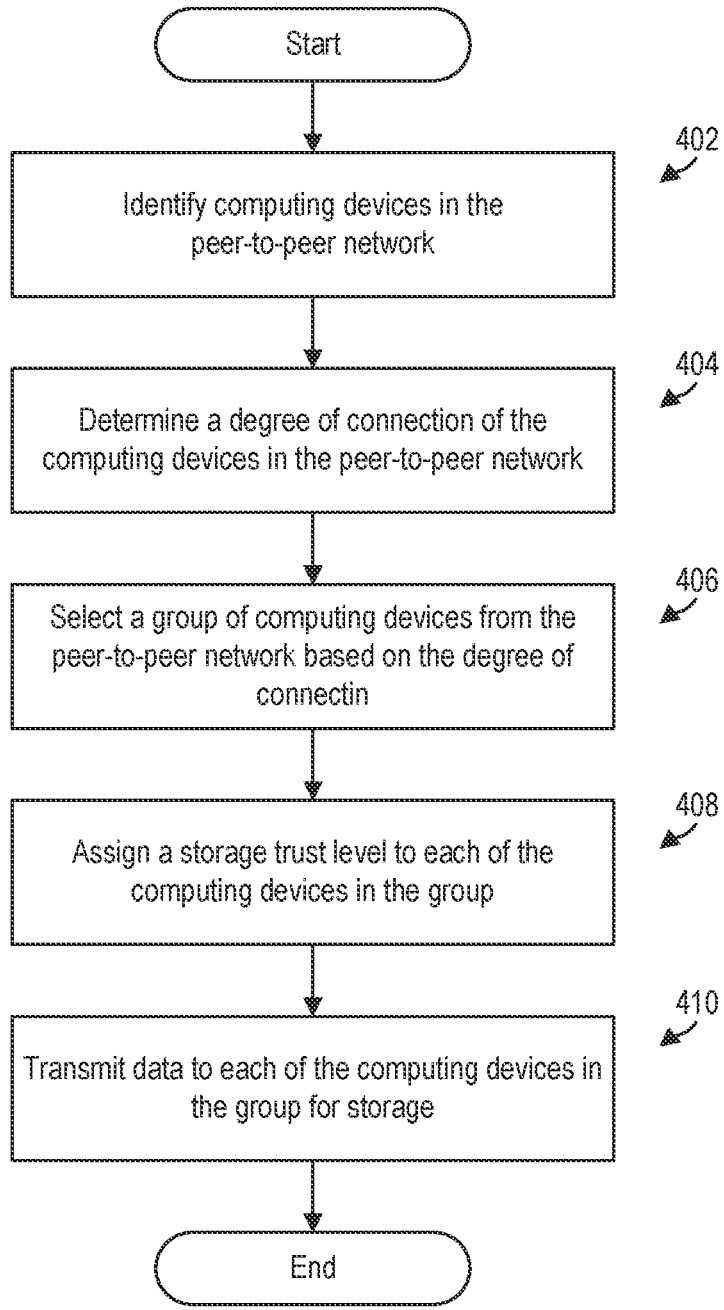
FIG. 4A illustrates an example flowchart of generating a social data storage list according to one embodiment of the disclosure.

FIG. 4A illustrates an example flowchart of generating a social data storage list according to one embodiment of the disclosure. In the discussion that follows, the computing device 110, including processor 114, performs the procedures. However, it is appreciated that any other functional unit or processing unit (such as processor 604) may implement the processes described herein, and the disclosure is not limited to implementation by the source node and processor.

At step 402, the computing device 110 (and/or the user associated with the computing device) identifies other computing devices 110 in the system 100. For example, a first computing device 110 identifies one or more other computing devices 110 in system 100 of a peer-to-peer network. In one embodiment, each of the identified computing devices 110 has an established social relationship with at least another one of the computing devices in the peer-to-peer network and the first computing device 110. The established social relationship may be based on any number of different factors, as described above. In one example embodiment, a user A associated with the first computing device 110 requests a backup a folder X currently stored on his mobile phone. Prior to requesting the backup, the user A will identify a list of members (associated with other computing devices) in the peer-to peer network of user A's social network 200. Members in the list are selected from those in the peer-to-peer network having established relationships with user A. For example, as shown in FIG. 2, user A may be associated with computing device 110. User A's established social relationships may include other members associated with computing devices 110A, 110B and 110C. These social relationships are illustrated by edges 204 between the computing devices. These computing devices 110A, 110B and 110C identified by user A may then be used to generate a list of members that that may store folder X of user A.

After the computing devices with an established relationship have been identified and a list generated, a degree of connection between the members in the peer-to-peer network is determined, at step 404. For instance, a degree of connection between the first computing device 110 of user A and members of the other computing devices 110A, 110B and 110C in the peer-to-peer network is defined as a degree of separation between two members—the first computing device 110 and the another of the computing devices (e.g., one of computing device 110A, 110B and 110C). As shown, for example, in FIG. 2, the degree of separation between computing device 110 and computing device 110A is one, and the degree of separation between computing device 110 and computing device 110B is two. The degree of separation is explained in more detail above.

In one example, after user A identifies the computing devices to store folder X, user A selects a degree of connection for storing folder X at the identified computing devices. If user A selects a degree of connection of two, then any of the computing devices with a degree of separation of one or two in the peer-to-peer network may store the folder X.

In one embodiment, the degree of connection is adjustable. For example, adjusting the degree of connection between the first computing device 110 and the other computing devices 110A, 110B, 110C increases the degree of separation when increased and decreases the degree of separation when decreased.

At step 406, user A selects a group of computing devices included in the list generated in step 404. The computing devices in the group may be selected according to any number of different embodiments. In one embodiment, the group may include all of the computing devices in the list. In another embodiment, the group may include any number of the computing devices in the list. In still another embodiment, the list may be generated based on the degree of connection. A few non-limiting examples follow.

In one example, the user A may randomly select computing devices from the list to form the group. In another example, the user A may select the computing devices based on a ranking or score of the computing devices (or of the user associated with the device). In yet another example, the user A may select the computing devices in the group based on established social relationships formed in a social network or in some other environment, such as relationships formed at work or school. For instance, user A selects other users from the generated list. Suppose there are 10 users in the list, User A may select any number (e.g., 5 users) of users in the list to form the group. These 5 other users may be selected, for example, based on factors such as friendship based on years of a personal relationship.

At step 408, a storage trust level is assigned to each of the computing devices that have been selected and form the group. In one embodiment, the storage trust level may be defined by one member based on identity ratings assigned to each of the other members in the peer-to-peer network. In a further embodiment, the identity ratings may be assigned based on the nature of the established social relationship between computing devices, as discussed above. In a further embodiment, the storage trust level may be based on a voting right or ranking assigned to each of the computing devices selected from the group.

For example, user A may assign a voting right (or rank) to each of the other users or members in the group, where the total voting right will sum to 100%. For purposes of the example, assume there are three users in a group. A first user (user B) may be assigned a voting right of 45%, a second user (user C) may be assigned a voting right of 45%, and a third user (user D) may be assigned a voting right of 10%, as shown in FIG. 3. In one embodiment, the voting rights of the first and second users carries a higher weight than the voting right of the third user. In another embodiment, a high voting rate (or rank) is assigned to members or users with a higher level of trust.

Once the voting rights have been assigned to each of the members in the group, a list of the members (associated with a computing device) in the group with a corresponding storage trust level may be generated.

At step 410, the generated list of members, including the corresponding storage trust level and data for storage (e.g., folder X), is transmitted to each of the computing devices in the generated list. For example, after user A selects members in the group for storing data, the list of computing devices associated with the selected members, including the storage trust level and the folder X, is transmitted to each of the computing devices for storage.

Figure 4B:
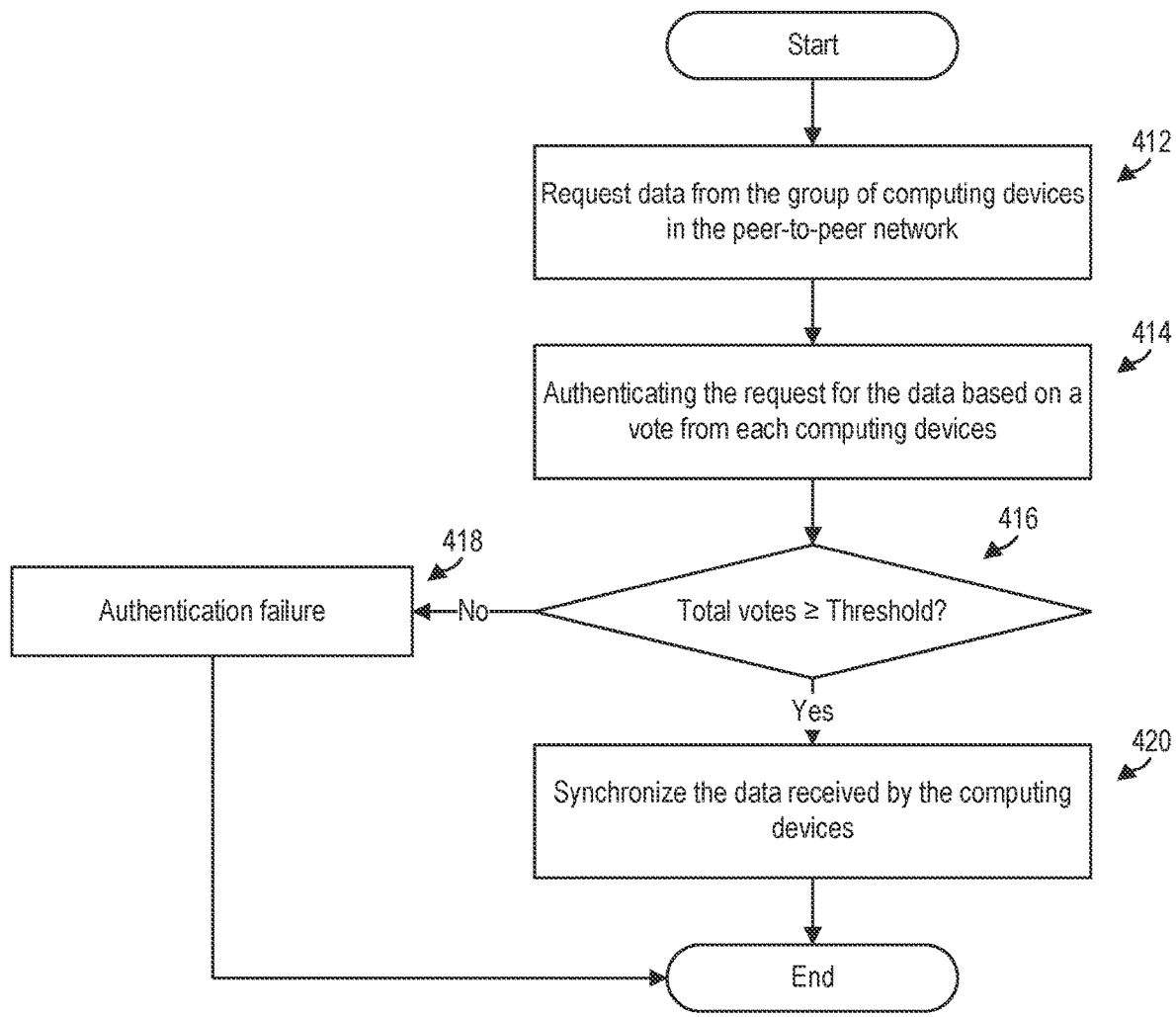
FIG. 4B illustrates an example flowchart of data recovery according to one embodiment of the disclosure.

FIG. 4B illustrates an example flowchart of data recovery according to one embodiment of the disclosure. In the discussion that follows, the computing device 110, including processor 114, performs the procedures. However, it is appreciated that any other functional unit or processing unit (such as processor 604) may implement the processes described herein, and the disclosure is not limited to implementation by the source node and processor.

When a computing device 110 wants to retrieve and synchronize files or data from storage in the peer-to-peer network, the computing device 110 requests data from the group of computing devices previously identified, at step 412. In one embodiment, the computing device 110 requesting the retrieval of data identifies one of the other computing devices (e.g., computing devices 110A, 110B, 110C) in the group of computing devices determined in the process illustrated in FIG. 4A. The identified computing device, e.g., computing device 110A, will initiate the process of an identifying rating in which to authenticate the requesting computing device 110. In particular, the identified computing device notifies each of the other computing devices (e.g., computing devices 110B and 110C) in the selected group that a request for files or data has been initiated by another computing device in the group.

For instance, user A of computing device 110 wants to retrieve folder X from backup storage on the peer-to-peer network. User A will select another user (e.g., user B) in the group that is associated with another one of the computing devices, e.g., computing device 110A. User A may then request the folder X from backup for synchronization. Since user B's computing device 110A appears in user A's list of computing devices (generated as discussed above), user B may initiate a voting request to each of the other computing devices in the list, e.g., computing devices 110B and 110C. Each of the computing devices 110B and 110C receiving the request, and the initiating computing device 110A, may then vote. Thus, if three members exist in the list, the first member initiates the voting request, and the other two members provide a vote.

At step 414, the computing device 110 requesting a retrieval of files or data from storage in the network is authenticated. In one embodiment, the authentication is based on an identity rating received from each of the other computing devices in the group. The identity rating is optionally adjustable. For example, to authenticate the identity of a member or peer in the group, other members may provide a rating by voting on the authenticity or confidence of a member. Following the example above, each of the members in the list generated by user A may vote to confirm or deny the identity of the requesting computing device 110 by rating a trustworthiness of the member associated with the computing device, a detailed example of which is provided above with reference to FIG. 3.

At step 416, the votes cast by each of the group members (excluding the requesting computing device) determine whether to authenticate the identity of user A associated with the requesting computing device 110. In the depicted embodiment, when the total of the votes are less than a threshold, the authenticity of the requesting computing device 110 is denied and the authentication fails, at step 418. For example, assume the threshold is 50% for purposes of discussion. User B of computing device 110A may vote with a negative confidence rating of 45%, user C of computing device 110B may vote with a positive confidence rating of 45%, and user D of computing device 110C may vote with a negative confidence rate of 10%. In this case, the total percentage of positive confidence ratings is 45% and the total of negative confidence ratings is 55%. Thus, less than 50% of the votes have a positive confidence level and the authentication of computing device 110 fails.

If the total of the votes is greater than or equal to the threshold, the authenticity of user A of the requesting computing device 110 is confirmed. For example, and assuming the threshold is 50%, two of the users (e.g., user B of computing device 110A and user C of computing device 110B) provide a 45% positive confidence rating and user C of computing device 110C provides a 10% positive confidence rating. In this case, the total percentage of votes by the computing devices 110A, 110B, and 110C is 100% (45%+ 45%+10%), and the computing device 110 of user A is authenticated.

At step 420, after the requesting computer device 110 is authenticated, the requested file or data is received by the computing device 110 from the other computing devices 110A, 110B and 110C in the group. The files and or data are then synchronized by the peer computing devices in the group with the requesting computing device 110. For example, user A will receive a copy of folder X from the peer computing devices in the group, and the folder X will be synchronized with each of the other peer computing devices.

Figure 5:
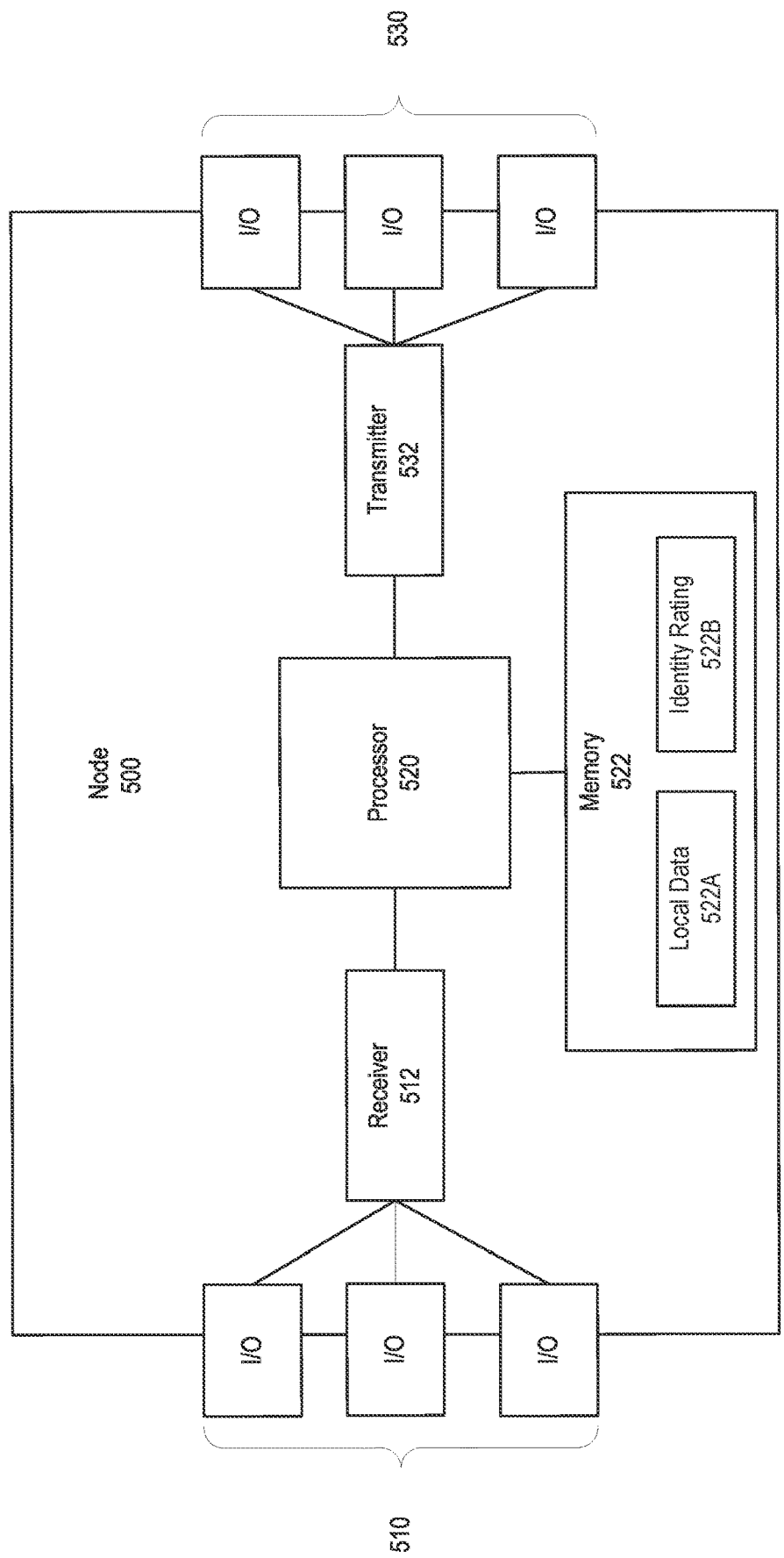
FIG. 5 illustrates an embodiment of a network node.

FIG. 5 illustrates an embodiment of a network node. The node 500 may be, for example, a computing device 110, or any other network component as described above in system 100, 200 or 300. The node 500 may comprise a plurality of input/output ports 510/530 and/or receivers (Rx) 512 and transmitters (Tx) 532 for receiving and transmitting data from other nodes, a processor 520 to process data and determine which node to send the data to and memory. The node 500 may also generate and distribute data in the form of data packets in the network. Although illustrated as a single processor, the processor 520 is not so limited and may comprise multiple processors. The processor 520 may be implemented as one or more central processing unit (CPU) chips, cores (e.g., a multi-core processor), field-programmable gate arrays (FPGAs), application-specific integrated circuits (ASICs), and/or digital signal processors (DSPs), and/or may be part of one or more ASICs. Moreover, the processor 520 may be implemented using hardware, software, or both. The memory 522 may be configured to store routing tables, forwarding tables, or other tables or information disclosed herein. Although illustrated as a single memory, memory 522 may be implemented as a combination of read-only memory (ROM), random access memory (RAM), or secondary storage (e.g., one or more disk drives or tape drives used for non-volatile storage of data). In one embodiment, the memory 522 stores local data 522A and identity rating 522B. The technology described above may also be implemented on any general-purpose network component, such as a computer or network component with sufficient processing power, memory resources, and network throughput capability to handle the necessary workload placed upon it.

Figure 6:
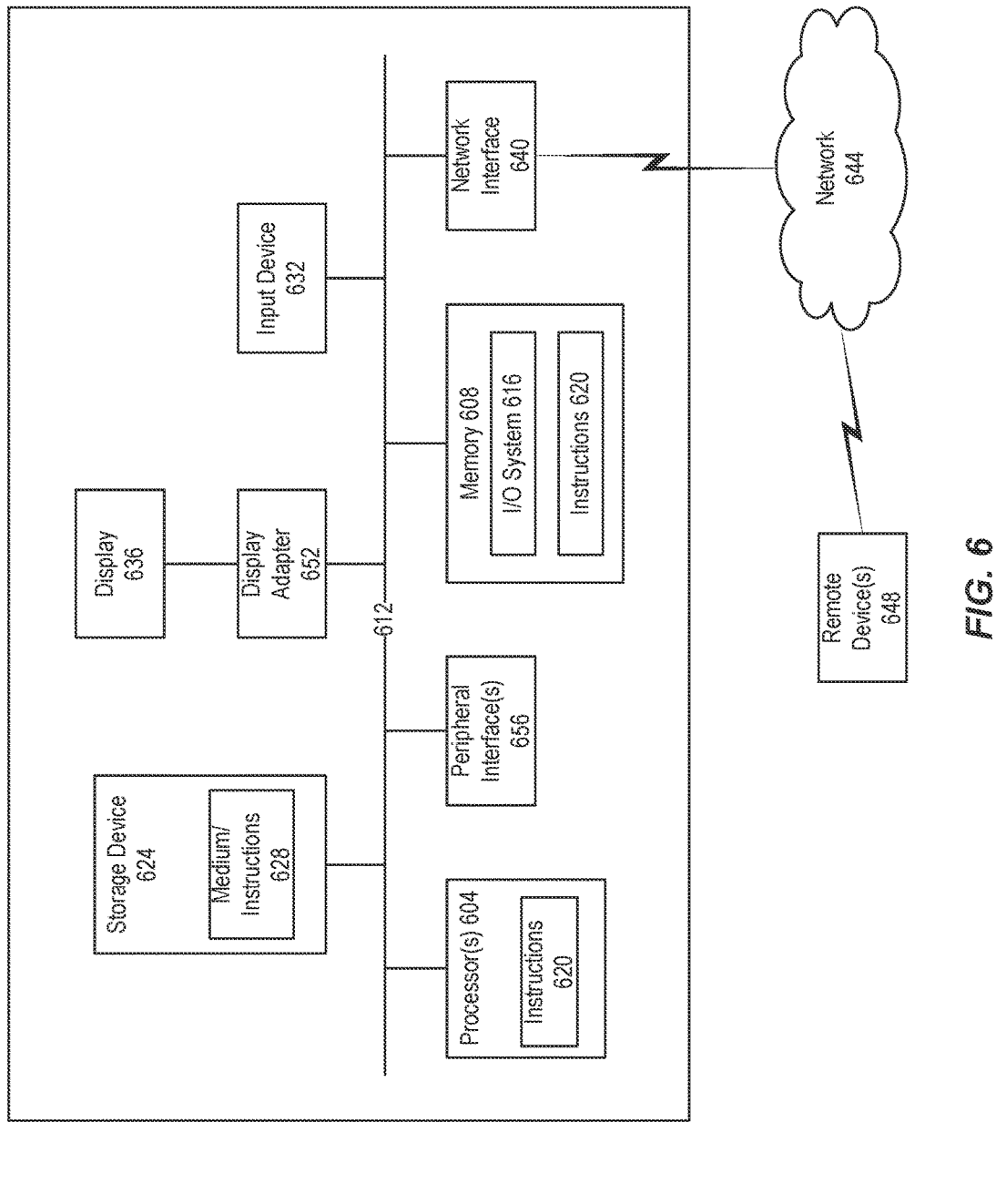
FIG. 6 illustrates a schematic diagram of a general-purpose network component or computer system.

FIG. 6 shows an example embodiment of a computing system for implementing embodiments of the disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read-only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, instructions 620 may reside, completely or partially, within machine-readable medium 628. In another example, instructions 620 may reside, completely or partially, within processor 604.

Computer system 600 may also include an input device 632. In one example, a user of computer system 600 may enter commands and/or other information into computer system 600 via input device 632. Examples of an input device 632 includes, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, instructions 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid-state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of storing data in a peer-to-peer network, comprising:
   identifying, by a first computing device, a plurality of computing devices in the peer-to-peer network, each of the computing devices having an established social relationship with at least another of the plurality of computing devices in the peer-to-peer network;
   determining, by the first computing device, a degree of connection between the first computing device and each of the plurality of computing devices in the peer-to-peer network, each degree of connection between the first computing device and the plurality of computing devices being a degree of separation between two users respectively corresponding to the first computing device and the plurality of computing devices;
   selecting, by the first computing device, a group of the plurality of computing devices based on the degree of connection for storing the data in the peer-to-peer network;
   assigning, by the first computing device, a storage trust level to each of the plurality of computing devices in the group, the storage trust level of each of the plurality of computing devices based on the established social relationship;
   transmitting, by the first computing device, the data to each of the plurality of computing devices in the group for storage; and
   requesting, by the first computing device, the data from the group of the plurality of computing devices and receiving by the first computing device the data from the group based on the plurality of computing devices in the group, each with an assigned voting right which may be different than other computing devices in the group, authenticating the request based on a vote of the group in which a total positive vote of the voting rights to authenticate satisfies a threshold.

2. The computer-implemented method of claim 1, further comprising generating a list of the plurality of computing devices, including the storage trust level of each of plurality of computing device, based on the degree of connection.

3. The computer-implemented method of claim 1,
   wherein the voting rights are based on an adjustable identity rating of each of the plurality of computing devices in the group, at least two of the identify ratings of the group of computing devices being different; and
   synchronizing the data received by the plurality of computing devices with the first computing device.

4. The computer-implemented method of claim 3, wherein the requesting further comprises:
   identifying, by the first computing device, one of the computing devices in the group of the plurality of computing devices, wherein the identified computing device in the group is configured to initiate the identity rating; and
   notifying, by the first computing device, each of the plurality of computing devices in the group that a request for the data has been initiated.

5. The computer-implemented method of claim 2, wherein the list of the plurality of computing devices and the data are stored on each of the plurality of computing devices in the list.

6. The computer-implemented method of claim 1, wherein the established social relationship between the first computing device and the plurality of computing devices is formed based on the established social relationships of corresponding users by at least one of a mutually declared relationship, an existing social network relationship and a stored contact list.

7. The computer-implemented method of claim 1, wherein the established social relationship is formed based on social interactions and shared experiences between users of the first computing device and each of the plurality of computing devices in the group.

8. The computer-implemented method of claim 1, wherein the storage trust level is defined by the first computing device based on identity ratings assigned to each of the plurality of computing devices by the first computing device, and the identity ratings are assigned based on a nature of the established relationship between the first computing device and each of the plurality of computing devices.

9. The computer-implemented method of claim 1, wherein the degree of connection between the first computing device and each of the plurality of computing devices in the peer-to-peer network is adjustable.

10. A non-transitory computer-readable medium storing computer instructions for storing data in a peer-to-peer network, that when executed by one or more processors, causes the one or more processors to perform the steps of:
    identifying a plurality of computing devices in the peer-to-peer network by a first computing device, each of the computing devices having an established social relationship with at least another of the plurality of computing devices in the peer-to-peer network;
    determining a degree of connection between the first computing device and each of the plurality of computing devices in the peer-to-peer network, each degree of connection between the first computing device and the plurality of computing devices being a degree of separation between two users respectively corresponding to the first computing device and the plurality of computing devices;
    selecting a group of the plurality of computing devices based on the degree of connection for storing the data in the peer-to-peer network;
    assigning a storage trust level to each of the plurality of computing devices in the group, the storage trust level of each of the plurality of computing devices based on the established social relationship;
    transmitting the data to each of plurality of computing devices in the group for storage; and
    requesting the data from the group of the plurality of computing devices and receiving the data from the group based on the plurality of computing devices in the group, each with an assigned voting right which may be different than other computing devices in the group, authenticating the request based on a vote of the group in which a total positive vote of the voting rights to authenticate satisfies a threshold.

11. The non-transitory computer-readable medium of claim 10, wherein the one or more processors further perform the steps of generating a list of the plurality of computing devices, including the storage trust level of each of the plurality of computing device, based on the degree of connection.

12. The non-transitory computer-readable medium of claim 10, wherein
the voting rights are based on an adjustable identity rating of each of the plurality of computing devices in the group, at least two of the identify ratings of the group of computing devices being different; and
synchronizing the data received by the plurality of computing devices with the first computing device.

13. The non-transitory computer-readable medium of claim 12, wherein the requesting further causes the one or more processors to perform the steps of:
identifying one of the computing devices in the group of the plurality of computing devices, wherein the identified computing device in the group is configured to initiate the identity rating; and
notifying each of the plurality of computing devices in the group that a request for the data has been initiated.

14. The non-transitory computer-readable medium of claim 11, wherein the list of the plurality of computing devices and the data are stored on each of the plurality of computing devices in the list.

15. The non-transitory computer-readable medium of claim 10, wherein the established social relationship between the first computing device and the plurality of computing devices is formed based on the established social relationships of corresponding users by at least one of a mutually declared relationship, an existing social network relationship and a stored contact list.

16. The non-transitory computer-readable medium of claim 10, wherein the established social relationship is formed based on social interactions and shared experiences between users of the first computing device and each of the plurality of computing devices in the group.

17. The non-transitory computer-readable medium of claim 10, wherein the storage trust level is defined by the first computing device based on identity ratings assigned to each of the plurality of computing devices by the first computing device, and the identity ratings are assigned based on a nature of the established relationship between the first computing device and each of the plurality of computing devices.

18. The non-transitory computer-readable medium of claim 10, wherein the degree of connection between the first computing device and each of the plurality of computing devices in the peer-to-peer network is adjustable.

19. A first computing device for storing data in a peer-to-peer network, comprising:
a non-transitory memory storage comprising instructions; and
one or more processors in communication with the memory, wherein the one or more processors cause the first computing device to execute the instructions to:
identify a plurality of computing devices in the peer-to-peer network, each of the computing devices having an established social relationship with at least another of the plurality of computing devices in the peer-to-peer network;
determine a degree of connection between the first computing device and each of the plurality of computing devices in the peer-to-peer network, each degree of connection between the first computing device and the plurality of computing devices being a degree of separation between two users respectively corresponding to the first computing device and the plurality of computing devices;
select a group of the plurality of computing devices based on the degree of connection for storing the data in the peer-to-peer network;
assign a storage trust level to each of the plurality of computing devices in the group, the storage trust level of each of the plurality of computing devices based on the established social relationship;
transmit the data to each of plurality of computing devices in the group for storage; and
receive the data from the group based on the plurality of computing devices in the group, each with an assigned voting right which may be different than other computing devices in the group, authenticating a request for the data, the authenticating based on a vote of the group in which a total positive vote of the voting rights to authenticate satisfies a threshold.

20. The first computing device of claim 19, wherein the one or more processors further cause the first computing device to execute the instructions to:
request the data from the group of the plurality of computing devices; and
synchronize the data received by the plurality of computing devices with the first computing device.

* * * * *

UNITED STATES PATENT AND TRADEMARK OFFICE
CERTIFICATE OF CORRECTION

PATENT NO. : 12,095,856 B2
APPLICATION NO. : 18/446880
DATED : September 17, 2024
INVENTOR(S) : Jian Li et al.

Page 1 of 1

It is certified that error appears in the above-identified patent and that said Letters Patent is hereby corrected as shown below:

In the Claims

• Column 21, Line 52 (Claim 2, Line 3): please replace "of plurality" with --of the plurality--

• Column 21, Line 53 (Claim 2, Line 4): please replace "computing device" with --computing devices--

• Column 22, Line 56 (Claim 10, Line 25): please replace "of plurality" with --of the plurality--

• Column 23, Line 3 (Claim 11, Line 5): please replace "computing device" with --computing devices--

• Column 24, Line 31 (Claim 19, Line 28): please replace "of plurality" with --of the plurality--

Signed and Sealed this
Thirty-first Day of December, 2024

Derrick Brent
*Acting Director of the United States Patent and Trademark Office*